United States Patent [19]

Vonken et al.

[11] Patent Number: 5,618,853

[45] Date of Patent: Apr. 8, 1997

[54] MOLDED STRUCTURE COMPRISING A THERMOPLASTIC, PROCESS FOR ITS PRODUCTION AND ITS USE

[75] Inventors: Hub A. G. Vonken, Weert; Hendrik-Jan Muntendam; Jos van der Hoeven, both of Horn, all of Netherlands; Udo Pique, Bad Soden, Germany

[73] Assignee: Hoechst Aktiengesellschaft, Frankfurt am Main, Germany

[21] Appl. No.: 549,080

[22] Filed: Oct. 27, 1995

Related U.S. Application Data

[63] Continuation of Ser. No. 283,628, Aug. 1, 1994, abandoned.

[30] Foreign Application Priority Data

Aug. 2, 1993 [DE] Germany .................. 43 25 879.4

[51] Int. Cl.$^6$ .................................................. C08J 9/18
[52] U.S. Cl. ........................... 521/60; 521/62; 521/63; 521/64; 521/79; 521/80; 521/81; 521/82; 521/142; 521/143; 521/146; 521/149; 521/150
[58] Field of Search ..................... 521/60, 62, 63, 521/64, 79, 80, 81, 82, 142, 143, 146, 149, 150

[56] References Cited

U.S. PATENT DOCUMENTS

| | | |
|---|---|---|
| 3,461,496 | 8/1969 | Winstead . |
| 3,610,509 | 10/1971 | Winstead . |
| 3,939,237 | 2/1976 | Naito et al. . |
| 3,950,278 | 4/1976 | Wada et al. . |
| 4,183,984 | 1/1980 | Browers et al. . |
| 4,232,130 | 11/1980 | Baxter et al. .................. 521/143 |
| 4,279,848 | 7/1981 | Baxter et al. . |
| 4,384,032 | 5/1983 | Tashiro et al. . |
| 5,116,881 | 5/1992 | Park et al. .................. 521/143 |
| 5,212,208 | 5/1993 | Soderberg .................. 521/96 |

FOREIGN PATENT DOCUMENTS

| | | |
|---|---|---|
| 0090507 | 10/1983 | European Pat. Off. . |
| 3057348 | 8/1991 | European Pat. Off. . |
| 2650718 | 5/1978 | Germany . |
| 54-31026 | 10/1979 | Japan . |
| 3-57348 | 8/1991 | Japan . |
| 1554373 | 10/1979 | United Kingdom . |
| 90/14159 | 11/1990 | WIPO . |

OTHER PUBLICATIONS

NZ–A 174515, "Foamed Polyolefine Film Discharge Treated Along Its Edges", New Zealand Patent Office Journal, No. 1157, Oct. 1975, p. 758.

NZ–A 189882, "Preparation Of Plasticised, Open–Cell, Foamed Cellulose Acetate Filter Rods", New Zealand Patent Office Journal, No. 1222, Mar. 1981.

NZ–A 148114, "Production Of Porous Polyvinyl Material", New Zealand Patent Office Journal, No. 1088, Jan. 1970, p. 19.

NZ–A 149639, "Polyvinyl Chloride Plastisols And Foams Therefrom", New Zealand Patent Office Journal, No. 1082, Jul. 1969, p. 593.

NZ–A 152356, "Air And Water Vapour Permeable Sheet Material Formed From Open–Celled Foamed Vinyl Chloride Polymer Or Copolymer And Suitable For Artificial Leather", New Zealand Patent Office Journal, p. 1114, Jul. 1967.

NZ–A 151256, "Method Of Making Water–Vapour Permeable Flexible Sheet Material", New Zealand Patent Office Journal, No. 1102, Mar. 1971, p. 165.

NZ–A 151257, "Method Of Making Permeable, Flexible Sheets In Two Layers", New Zealand Patent Office Journal, No. 1102, Mar. 1971, p. 165.

"Schäume aus der thermoplastischen Schmelze", Kunststofftechnik, VDI–Verlag Düsseldorf, 1981, p. 61.

*Primary Examiner*—James J. Seidleck
*Assistant Examiner*—John M. Cooney, Jr.
*Attorney, Agent, or Firm*—Foley & Lardner

[57] ABSTRACT

A molded structure 1 produced by extrusion, such as an expanded plastic foam, a sheet, a profile or the like, contains at least 10% by volume of open cells 2, 4 which have a polyhedron-like shape and are adjacent to one another. A higher temperature during the extrusion in comparison with the extrusion of thermoplastic molded structures having a closed-cell structure results in deformation-free opening of the cells. Webs 3 of cell walls 5, 6 remain intact in shape whether they have orifices 7 or no passages, so that the mechanical strength of the cell skeleton or of the space matrix is retained.

36 Claims, 6 Drawing Sheets

MOLDED STRUCTURE COMPRISING A THERMOPLASTIC, PROCESS FOR ITS PRODUCTION AND ITS USE

This is a continuation, of application Ser. No. 08/283,628, filed Aug. 1, 1994, which is now abandoned.

BACKGROUND OF THE INVENTION

1. Field of the Invention

The present invention relates to a molded structure comprising a thermoplastic synthetic resin which contains at least 10% by volume of open cells, a process for the production of a molded structure and the use of the molded structure.

The molded structure is an open-cell expanded plastic foam which, in contrast to an expanded plastic foam having closed cells, is capable of absorbing liquids.

2. Description of Related Art

Expanded plastic foams have long been known; in particular, expanded polystyrene foams have a wide range of uses. They are used, for example, as packaging shells and in the building sector, especially as insulating material, for example, as an underlay for wallpaper.

Expanded plastic foams are generally produced by extruding a thermoplastic synthetic resin together with a blowing agent, in particular a gaseous blowing agent, from an annular or slot die or coextrusion die. Shortly after leaving the extrusion die, the blowing agent finely distributed in the plastic expands so that very fine bubbles form in the expanded plastic molding. Smaller or larger bubbles are obtained depending on the process conditions with regard to the temperature and the extrusion rate. Accordingly, the expanded plastic foam thus produced contains densely packed, closed, gas-filled cells, the gas enclosed in the cells generally being air and/or residues of the blowing agent. The excellent insulating properties of the expanded plastic foams are essentially based on the densely packed, closed, gas-filled cells which to a certain extent form an "immobile" gas, in particular air, layer. Such an "immobile" air layer has poor thermal conductivity.

An expanded plastic foam in which the cells are not closed but open, i.e., have a through passage, shows completely different behavior. Such an expanded plastic foam can, for example, store liquids similarly to a sponge. In the case of such open-cell foams, the cells are connected to one another via the gas phase. In the extreme case, they comprise only cell webs.

The document WO 90/14159 describes an oil-absorbing material which comprises comminuted polyethylene foam, but this document gives no indication as to how an intact absorptive expanded plastic foam is to be obtained. By exerting the mechanical pressure on the expanded plastic foam, a major part of the previously closed cells of the polyethylene foam can be opened. However, the mechanical strength and the stability of the expanded plastic foam are substantially reduced since some of the cell walls are deformed by the mechanical pressure. Such a film may contain more than 50% of open cells.

EP-A-0 090 507 discloses shell-like packaging for fast food, which packaging comprises an open-cell expanded polymer layer and a closed-cell polymeric outer layer as a liquid barrier layer. For example, polystyrene is used as the polymer for both layers. The open-cell expanded plastic foam is formed in the same way as the extrusion of the closed-cell outer layer, with the single exception that an excess of nucleating agent, such as, for example, sodium bicarbonate and citric acid, is added in a weight ratio of from 0.8 to 1.2 and from 1.2 to 0.8, but the use of a blowing agent is dispensed with. Since no blowing agent is used, only a single mixing chamber and a single extrusion screw are required. In this known process, an open-cell expanded polystyrene layer having an average content of open cells of 50 to 90% by volume is obtained. However, this known process does not give a cell structure in which the individual cells are connected to one another; instead, only the cells in the surface of the expanded plastic foam are connected to the adjacent cells underneath, but a cell structure in which the cells are directly adjacent to one another and are separated from one another only by the cell walls is not obtained.

Japanese Patent No. 3-57348 discloses a moisture-absorbing packaging material comprising a molding which contains a homogeneous mixture of 50 to 85% by weight of ethylene polymer and 15 to 50% by weight of an adsorbent which does not swell on absorbing water.

Japanese Patent No. 54-31026 describes a process for the production of a polypropylene foam having an open-cell structure, in which homopolymers or copolymers of propylene are gelled under pressure and with heat, with the addition of chlorofluorocarbons as blowing agents or expanding agents and of a conventional nucleating agent. The extruded polypropylene foam has a uniform and fine cell structure possessing a mean cell diameter of 0.5 mm and a density of about 0.028 g/cm$^3$. The absorptivity of the polypropylene foam for water is 3 to 7.6 times the foam density.

SUMMARY OF THE INVENTION

One object of the present invention is to provide a molded structure comprising an expanded plastic foam, having an open-cell structure which is variable within wide ranges, the cells being connected to one another and the cells present in the interior of the molded structure being permeable to media without mechanical destruction of cell walls.

Another object of the present invention is to provide a process for the production of a molded structure comprising an open cell expanded plastic foam by an extrusion method. Still another object of the invention is to provide an open cell expanded plastic foam produced by the extrusion method. Yet another object of the present invention is to provide an article of use which includes the open cell expanded plastic foam.

In accomplishing the foregoing objects of the present invention, there has been provided according to the present invention, a molded structure comprising an expanded plastic foam, which includes a thermoplastic synthetic resin, and polyhedron shaped cells located within the molded structure and occupying at least 10% of the volume of the molded structure. The cells have walls, and at least two walls of each of the cells have openings therein to form an open cell. The molded structure also includes webs formed by the cells being arranged next to each other and a space matrix within the expanded plastic foam, which are defined by the cells and webs. The space matrix is neither mechanically nor thermally deformed.

Another aspect of the present invention provides a process for producing the open cell molded structure. The process includes the steps of: melting a mixture in a first extrusion step at a temperature of less than or equal to about 300° C. to form a polymer melt, the mixture including at least one polymer and at least nucleating agent; injecting a blowing agent into the polymer melt at the end of the first extrusion step; mixing the blowing agent homogeneously with the polymer melt; cooling the polymer melt in a second extrusion step; and extruding the polymer melt to form the open cell expanded foam.

In one preferred embodiment, the open cells are formed by cooling the polymer melt in the second extrusion temperature to a melt temperature which is in the lower limit of the pseudoplastic viscous temperature range of the at least one polymer immediately before extrusion, wherein the melt temperature of the at least one polymer in the second extrusion step is approximately 10 to 20% higher than the melt temperature during extrusion of a closed cell expanded plastic foam made of the polymer mixture.

In another preferred embodiment, the open cells are formed by replacing an amount of the at least one polymer with a foreign polymer, in an amount by weight which is of the same order of magnitude, wherein the wettability of the foreign polymer in the polymer melt is substantially zero.

Another aspect of the present invention provides an open cell expanded plastic foam produced by the above process. Yet another aspect of the present invention provides a product made from the expanded plastic foam. Examples of such products are a packaged article and a suction filter.

DETAILED DESCRIPTION OF THE PREFERRED EMBODIMENTS

The present invention comprises a molded structure of the type described above where the cells have a polyhedron-like shape and are adjacent to one another. The webs of the polyhedron-like cells are arranged in a space matrix being intact in shape, and at least two walls of each open cell have orifices, with retention of the mechanical strength of the space matrix.

In a further embodiment of the invention, at least a part of one of the surfaces of the molded structure is open so that the cells adjacent to the surface are accessible to liquids.

In another embodiment of the invention, the molded structure is a thermoplastic foam preferably of at least one plastic selected from polyolefins, such as polyethylene (HDPE, LDPE, LLDPE), chlorinated polyethylene, polypropylene (PP), polypropylene copolymers (PPC), ethylene/vinyl acetate copolymers (EVA) and halogenated polyolefins; styrene polymers, such as polystyrene (PS), polystyrene copolymers (PSC), acrylonitrile/butadiene/styrene copolymers (ABS), styrene/maleic anhydride and high-impact polystyrenes (HIPS); polyesters, such as polyalkylene terephthalate; other polymers such as ethylene/propylene terpolymer and polyvinyl chloride (PVC); and/or polyphenylene oxide.

The expanded plastic foam preferably comprises thermoplastic polymers or blends of thermoplastic polymers (including CO polymers) or blends of thermoplastic and nonthermoplastic polymers.

In a further embodiment, the starting materials of the expanded plastic foam are at least one polymer and one gaseous blowing agent and/or one nucleating agent. The nucleating agent may also serve as a gaseous blowing agent and, conversely, the gaseous blowing agent may serve as a nucleating agent. At least one polymer and gaseous blowing agent are required, and a cell structure regulator is also used, if required. Preferably, the polymer is polystyrene in an amount of up to about 95% by weight, the nucleating agent is preferably talc, chalk, sodium carbonate, sodium bicarbonate and/or citric acid, in an amount of up to about 3% by weight, and the blowing agent is preferably butane, propane, $CO_2$ or mixtures thereof in an amount of up to about 6% by weight. The amounts by weight of the individual components depend specifically on the type of extruder used.

In another embodiment of the invention, a certain amount, by weight, of the polymer is replaced by a foreign polymer in an amount by weight which is of the same order of magnitude.

By changing the amounts by weight of the starting materials of the expanded plastic foam, the proportion of the open-cell structure can be varied within wide ranges. As a result of the aftertreatment, a foam of the present invention has a greater proportion of open cells on the aftertreated side than on the untreated side. The invention gives rise to the advantage that the rigid expanded plastic foam shows virtually no difference in its mechanical properties, such as tensile strength and modulus of elasticity, compared with the same properties of an expanded plastic foam of the same type with a mainly closed-cell structure. This advantage applies even when the proportion of open-cell structure is at least 50% by volume. This is due to the fact that, although the cells of the expanded plastic foam are open, the actual cell skeleton is retained and is neither mechanically nor thermally deformed or destroyed.

The term "cells" is to be understood as meaning the cavities contained in the expanded plastic foam. These cells are closed when the cell walls surrounding the cavity are composed of plastic which is unperforated or impermeable to a medium in another manner. The term open cells is used when at least two of the cell walls surrounding the cavity have orifices, so that an exchange of material, in particular an exchange of fluid media, is possible between adjacent cells.

The number of closed or open cells can be established by standardized methods for determining the volume fraction of open and closed cells in rigid foams (e.g., according to DIN 4590). The stated % by volume for open cells is then based in each case on the total volume of a representative volume unit.

The present invention also provides a process for the production of molded structures comprising an expanded plastic foam. The process of the present invention has only slight but important modifications of the process steps compared with the conventional extrusion process for expanded plastic foams. The process includes a first extrusion step in which the polymer melt comprising at least one polymer and nucleating agent is melted at a temperature of up to about 300° C., a blowing agent is then injected under high pressure of up to about 350 bar into the polymer melt at the end of the first extrusion step and is homogeneously mixed with the latter. In a second extrusion step, the polymer melt is cooled to a melt temperature in the range from about 120° to 250° C. prior to extrusion. This second melt temperature is about 10 to 20% higher than the melt temperature during extrusion of closed-cell expanded plastic foams.

The expanded plastic foams of the present invention are polymers which can be extruded in a wide temperature range to give stable foams, i.e., they are amorphous polymers, such as polystyrene. In the case of crystalline polymers, the temperature is adjusted to within about ±2° C. of the crystallization temperature. The open cell character is achieved by corresponding adjustment of the production variables, such as die pressure of the extrusion die, amount of gaseous blowing agent and cell size.

In a further embodiment of the process, at least one of the surfaces of the extruded molded structure is partially opened by mechanical processing, such as scraping, scratching or perforation, or by cooling and simultaneous extension on emergence from the extrusion die. In a variation of the process of the present invention, a certain amount by weight of the polymer is replaced by a foreign polymer in an amount which is of the same order of magnitude, and the wettability of the foreign polymer in the polymer melt is virtually zero.

The molded structure produced is used as packaging material for moisture-containing goods and as a suction filter. This list of possible uses is by no means complete but represents only a few of several possible uses.

Depending on the temperature gradient during the extrusion of the expanded plastic foams, the open cells are located in the interior of the expanded foam to a greater or lesser extent, with the surface of the foam being closed. As a result of the aftertreatment, the open cell character is then achieved in the direction of one of the surfaces of the foam.

Figure 1A:
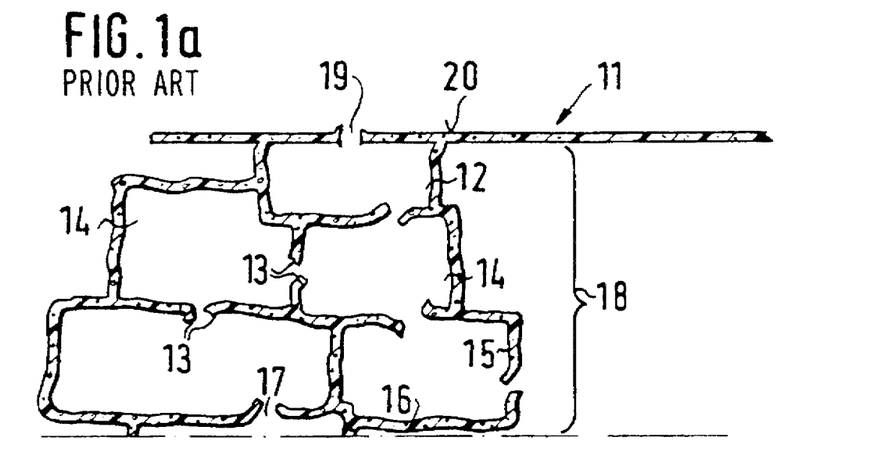
FIG. 1a shows a schematic sectional view of conventional expanded plastic foams having an open-cell structure, in which the cells are opened by mechanical pressure.

The invention is illustrated in more detail below with reference to the drawings. FIG. 1a shows a schematic section through a molded structure 11 which is obtained by extruding a plastic melt according to the prior art and subsequently subjecting the extruded expanded plastic foam to mechanical pressure. During expansion of a thermoplastic, such as polystyrene, a film having a closed-cell structure is formed in the known conventional processes. Polystyrene can be processed by the extrusion process to give various foam products having a closed-cell structure. Different blowing agents and nucleating agents are used in order to achieve desired properties. The cell size, density and structure of the expanded plastic foam and whether or not open cell character is obtained can be varied as required by means of physical variables and additives. The expanded plastic foam to be produced and having a closed-cell structure is used in various areas, use being made of specific properties, such as low density, insulating power and deformability.

By applying mechanical pressure to a surface 20 of the molded structure 11, the initially closed cells 12, which are directly adjacent to the surface 20, and the cells 14 underneath are mechanically broken open, so that orifices 17 form in the cell walls 15 and 16. Webs 13 of the cell walls are mechanically deformed to such an extent that the individual cells and the space matrix 18 of the molded structure lose their mechanical strengths. This may result in the upper layers of the molded structure 11 collapsing from a rigid foam and the expanded plastics film thus becoming flexible. This same phenomenon also applies to flexible foams comprising polyethylene and foams derived therefrom.

Figure 1B:
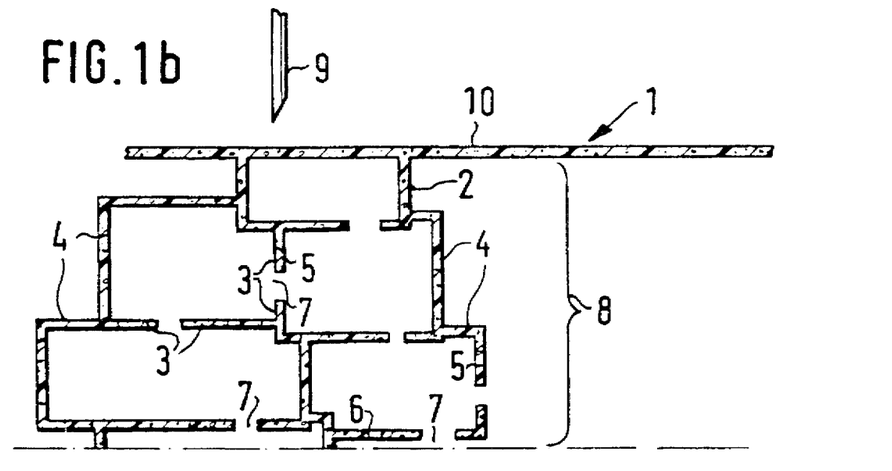
FIG. 1b shows a schematic sectional view of expanded plastic foams having an open-cell structure according to the invention.

FIG. 1b shows a molded structure 1 according to the present invention, comprising a thermoplastic, in which cells 2 and 4 have a generally polyhedron-like shape with a preferable maximum dimension of about ≦1.0 mm, in particular about ≦0.4 mm, and are adjacent to one another. A surface 10 of the molded structure 1 is initially closed, but is opened by mechanical processing, such as scraping, scratching or perforation. The surface 10 may also be opened by cooling and simultaneous extension during extrusion. Perforation is so-called needling of the surface 10 with a needle-like tool 9. The cells 2 and 4 form a space matrix 8 or a cell skeleton and are intact in shape, i.e., cell walls 5 and 6, which are provided with orifices 7, preferably exhibit no mechanical deformations at all. Two walls 5, 6 of each open cell 4 have such orifices 7. Webs 3, which are not deformed in comparison with the molded structure 11 in FIG. 1a, are located on both sides of each orifice 7. The reference number 2 denotes the cells directly adjacent to the surface 10, while the cells underneath are denoted by the reference number 4.

Figure 2:
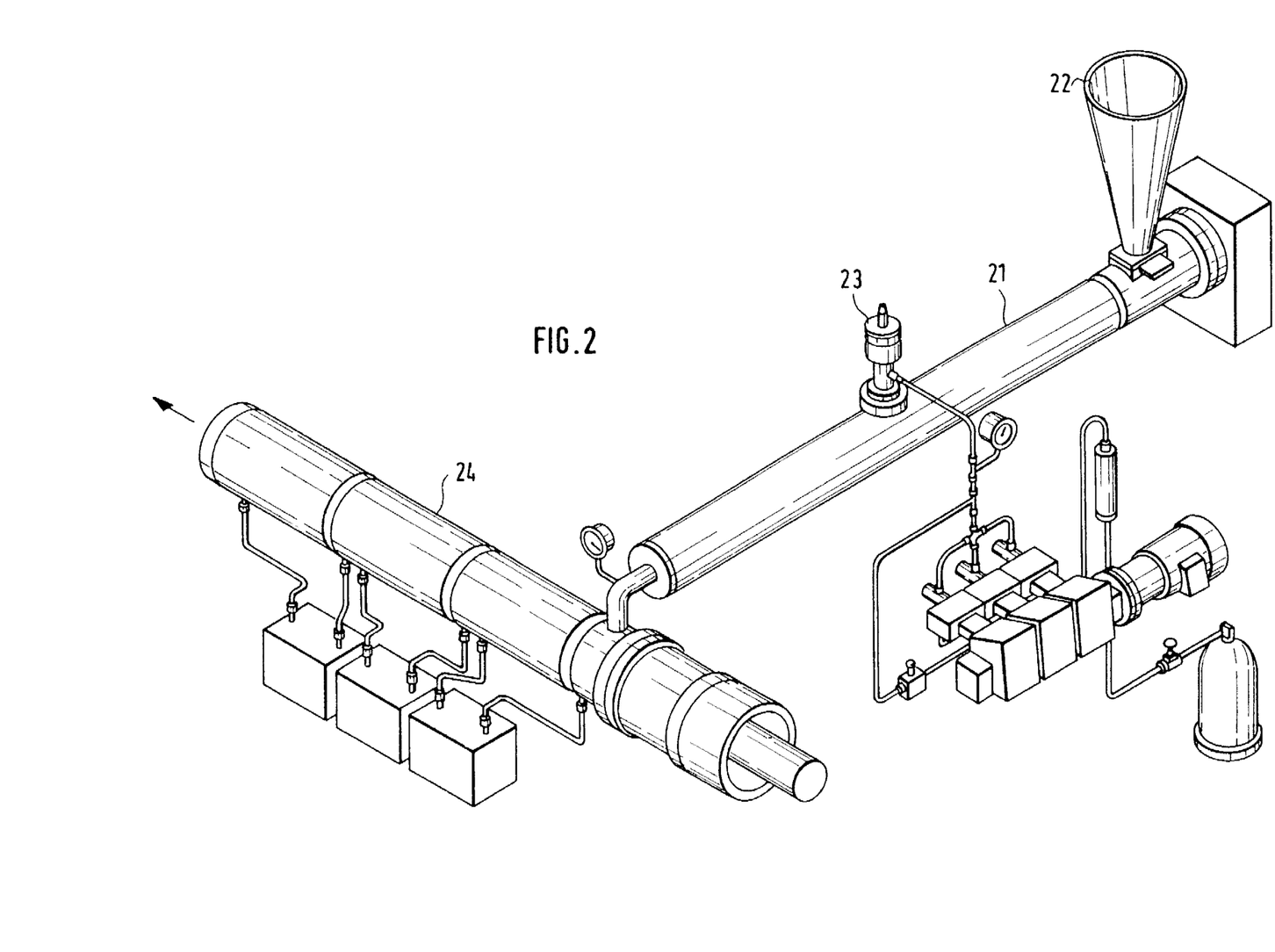
FIG. 2 shows a perspective view of a tandem extrusion installation for the production of open-cell expanded plastic foams according to the invention.

FIG. 2 shows, for example, a perspective view of an extrusion installation for the production of the molded structure 1 according to the present invention. This installation does not differ from a conventional installation for the production of closed-cell expanded plastic materials. A first extruder 21 is loaded, via a feed hopper 22, with plastic granules mixed with a nucleating agent. In the extruder, the mixture of plastic granules and nucleating agent is homogeneously mixed and, depending on the type of plastic granules, the mixture is melted by heating to a temperature of up to about 300° C. In the first extruder 21, the plastic melt is treated with a blowing agent via a blowing agent injector 23 under high pressure of up to about 350 bar. This blowing agent is homogeneously mixed with the plastic melt, and the mixture is fed to a second extruder 24. In the second extruder, the plastic melt is cooled to a melt temperature in the region of the lower limit of the pseudoplastic viscous temperature range, e.g., from about 120° to 250° C., prior to extrusion. This melt temperature is generally about 10 to 20% higher than the melt temperature during extrusion of plastic melts to give closed-cell expanded plastic foams. For example, the melt temperature of a plastic melt whose basic material is polystyrene is about 170° C., whereas the melt temperature of the polystyrene on emergence at the extrusion die is usually about 150° C. The temperature is one of the control variables. In addition, it is possible to use variables such as density, cell size and die pressure.

In the production of closed-cell expanded plastic materials, the pressure of the blowing agent or gaseous blowing agent at about 150° C. during emergence from the extrusion die has the effect that the plastic melt is converted from the plastic into the approximately elastic state as a result of cooling. Rapid evaporation and expansion of the blowing agent and a temperature loss of about 20° C. thus occurs at the extrusion die. The extruded expanded plastic foam then slowly cools further.

Figure 3:
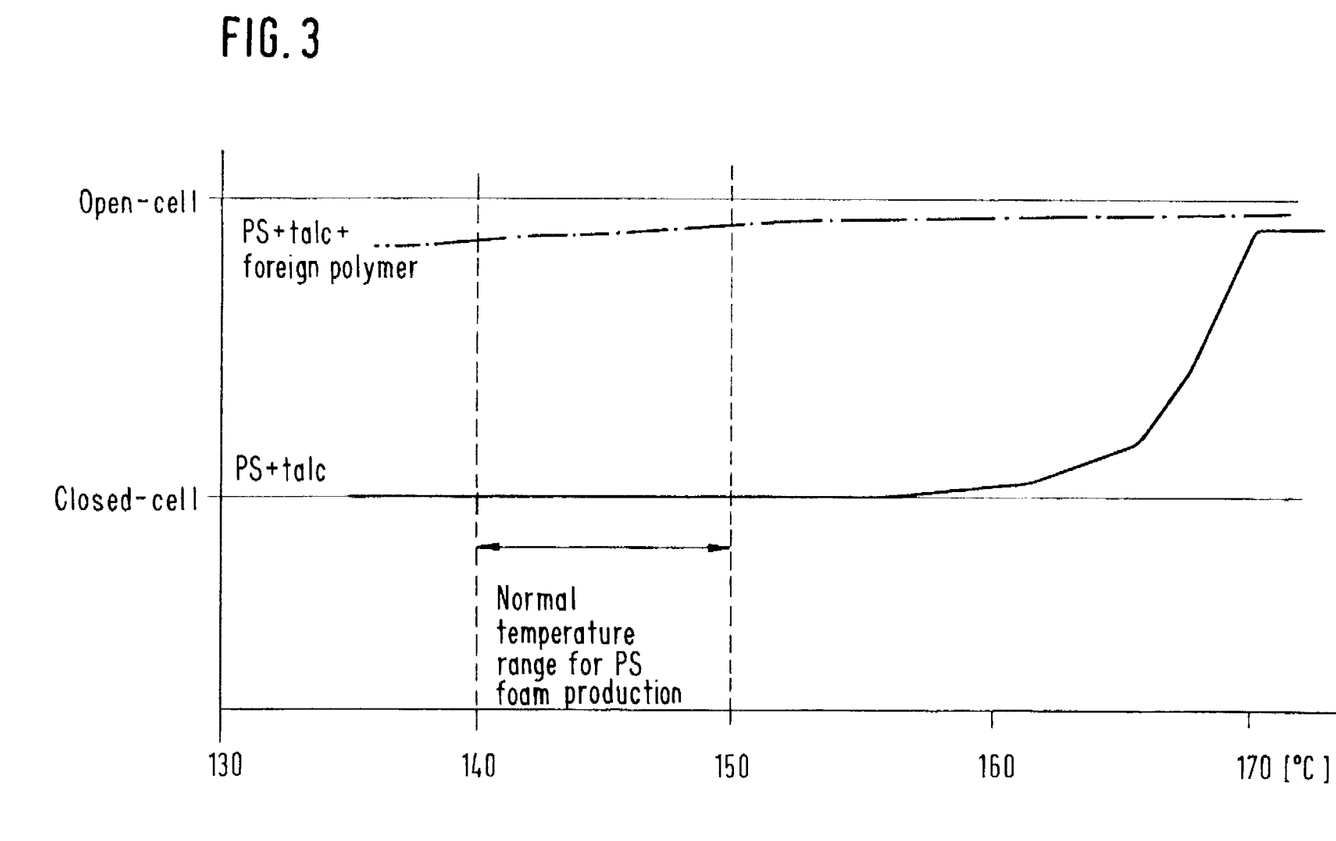
FIG. 3 is a graph showing the relationship between the temperature of the plastic melt comprising polystyrene on emergence from an extrusion die and the formation of an open-cell and closed-cell structure of the expanded plastic foam.

FIG. 3 is a graph showing the formation of a closed-cell and open-cell structure in a polystyrene (PS) foam, as a function of the temperature of the plastic melt at the annular extrusion die. As is evident from the lower curve, the cells of the polystyrene foam are substantially closed up to a temperature of about 155° C. As temperatures of the polystyrene melt increase further at the outlet of the annular extrusion die, cells of the polystyrene foam begin to open, and the cells have for the most part opened at an outlet temperature of the polystyrene melt of about 170° C. The usual temperature range for the production of closed-cell polystyrene foams is in the range from about 140° to 150° C. Here, talc is added as a nucleating agent to the basic raw material polystyrene. The upper curve in graph 3 shows polystyrene foam which substantially has an open-cell structure over a temperature range from about 135° to 170° C., as the outlet temperature of the polystyrene melt at the annular extrusion die. The starting materials of this polystyrene foam are polystyrene granules, talc as a nucleating agent and a foreign polymer. The graph shows that an open-cell structure of the polystyrene foam according to the present invention can be achieved either by appropriately increasing the outlet temperature of the polystyrene melt at the annular extrusion die or by adding a foreign polymer to the standard formulation of the polystyrene foam in the usual temperature range from about 140° to 150° C., in particular about 150° C.

Regarding the higher temperature for achieving an open-cell polymer foam, it is generally true that the temperature must be about 10 to 20% higher than the temperature during extrusion of closed-cell polymer foams. Due to the higher temperature at the extrusion die, under conditions and formulations otherwise identical to those in the production of closed-cell expanded plastic materials, the blowing agent enclosed in the cells leads to uniform opening of the flexible cell walls, and a skin then covers the expanded plastic foam in the cooling phase outside the extrusion die. If the surface of this expanded plastic foam is scraped off, scratched or needled, i.e., mechanically perforated, the result is exposure of the open-cell structure, which is suitable for absorbing an apolar liquid, i.e., oil-like liquids. The opening of the surface is also achieved by cooling and simultaneous extension or stretching of the extruded expanded plastic foamstructure.

As a result of the higher temperature setting, the viscosity decreases, and the cell walls open due to the increased gas pressure, without bursting and without deformations, resulting in the effect of the open-cell structure. Even when the cells close at the surface as a result of the further cooling and must be opened by a mechanical treatment, the cells in the interior of the expanded plastic foam do not close, i.e., they still remain open.

Figure 4:
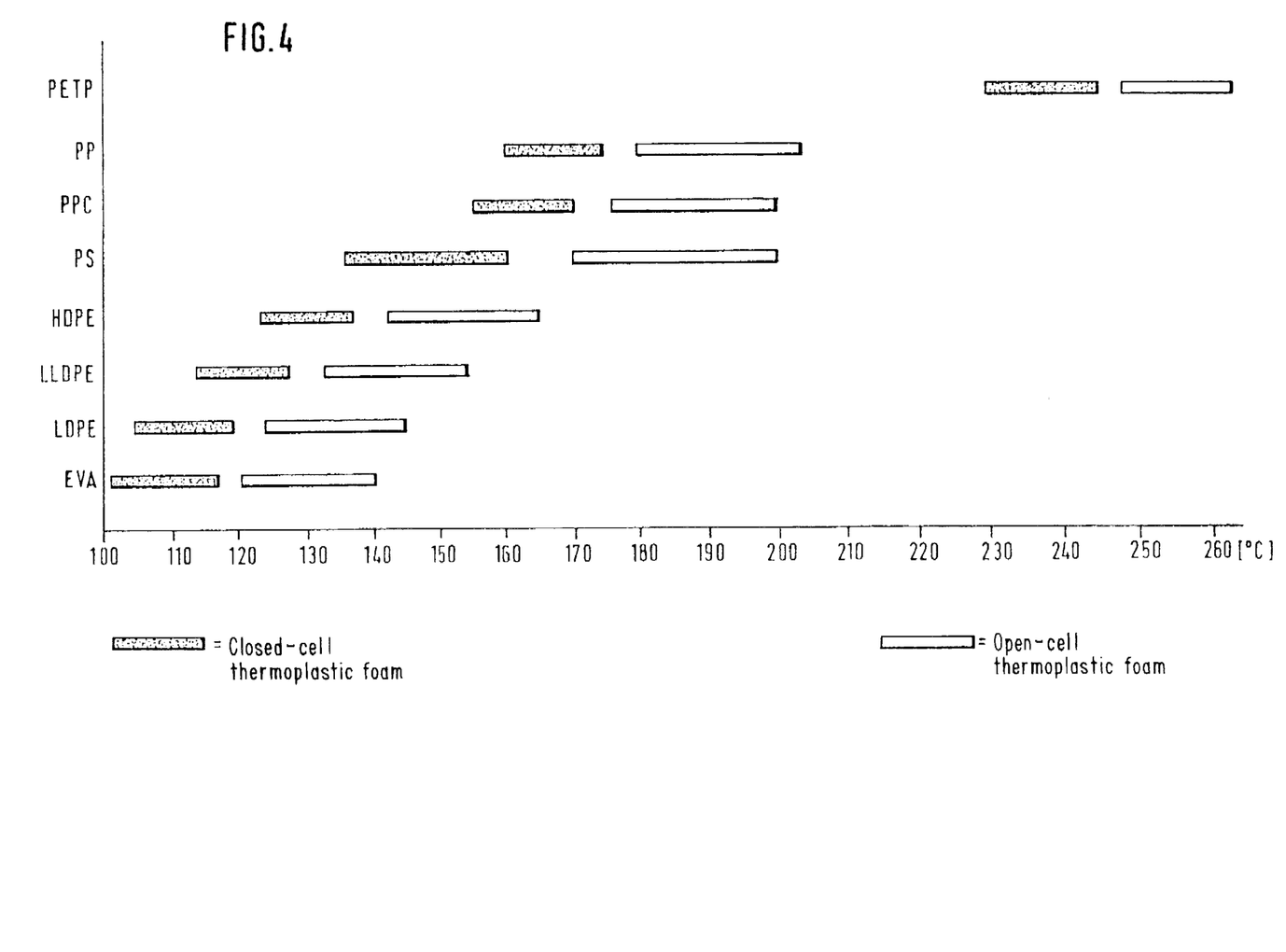
FIG. 4 is a graph showing the relationship between the temperature of melts of various plastics on emergence from an extrusion die and the formation of an open-cell and closed-cell structure of the expanded plastic foams.

In the graph of FIG. 4, the temperature ranges of the particular polymer melt in an extrusion die or at the outlet of an extrusion die are stated in ° C. for various amorphous polymers. The shaded temperature ranges for the particular polymer are suitable for achieving closed-cell structures, while the unshaded, higher temperature ranges of the relevant polymer lead to open-cell structures in production. Table 3 (at the end of the description) indicates the temperature ranges of different amorphous polymer melts in an extrusion die or at the outlet of the extrusion die. In the case of crystalline polymers, the melt temperature must be close to the crystallization temperature (±2° C.) in order to be able to extrude the foam. Both for the shaded and for the unshaded temperature ranges of amorphous polymers, it is true that the amount of blowing agent injected into the polymer melt is low for the lowest temperature of each range and that the cell structure obtained has fine pores. In the case of the highest temperature of each temperature range, a relatively large amount of blowing agent is injected, and the cell structure obtained has coarse pores. The cell size can of course also be controlled by means of variables other than the blowing agent.

The thermoplastic polymers which can be processed to give expanded plastic foam are polymers preferably selected from polyolefins, such as polyethylene (HDPE, LDPE, LLDPE), chlorinated polyethylene, polypropylene (PP), polypropylene copolymers (PPC), ethylene/vinyl acetate copolymers (EVA) or halogenated polyolefins; styrene polymers, such as polystyrene (PS), polystyrene copolymers (PSC), acrylonitrile/butadiene/styrene copolymers (ABS), styrene/maleic anhydride and high-impact polystyrenes (HIPS); polyesters, such as polyalkylene terephthalate; other polymers such as ethylene/propylene terpolymer and polyvinyl chloride (PVC); and/or polyphenylene oxide. This list is given only by way of example, and the polymers in this list are not the only polymers that can be used in the present invention.

It is also possible to produce expanded plastic materials from thermoplastic polymers or blends of thermoplastic and nonthermoplastic polymers, from polymers, copolymers or blends of thermoplastic polymers and/or copolymers. Such blends may include, for example, polypropylene/polyethylene, polypropylene/polybutylene or polypropylene/polyethylene/polybutylene terpolymers.

Starting materials of the expanded plastic foams are in each case generally granules, powder or a masterbatch comprising one of the above-mentioned polymers, copolymers or blends, nucleating agents and/or blowing agents.

For the production of the open-cell extruded polymer foams, a certain amount by weight of the polymer can also be replaced by a foreign polymer in an amount by weight which is generally of the same order of magnitude. In general, the amount by weight of the foreign polymer is smaller than the amount by weight of the polymer and is generally of the order of magnitude of about 0.2 to 9% by weight, preferably about 2 to 5% by weight based on the total weight of the polymer. Depending on the type of extruder, it may also be necessary to increase the amount of foreign polymer above about 6% by weight, up to about 9% by weight. Additives, such as wetting agents, may also be added to these starting materials in order to increase the absorptivity for, in particular, polar liquids. The densities of the expanded plastic foams are generally in the range from about 0.02 to 0.30 g/cm$^3$ preferably about 0.02 to 0.350 g/cm$^3$. The absorptivity for polar liquids is generally about 1 to 30 times, in particular about 8 to 10 times, the foam density.

The foreign polymer is chosen so that it has only very little affinity with the polymer matrix, i.e., the wettability of the foreign polymer in the polymer matrix is virtually zero. A possible explanation of the action mechanism of the foreign polymer is given below, but a different hypothesis with regard to the action mechanism should by no means be ruled out.

Figure 5A:
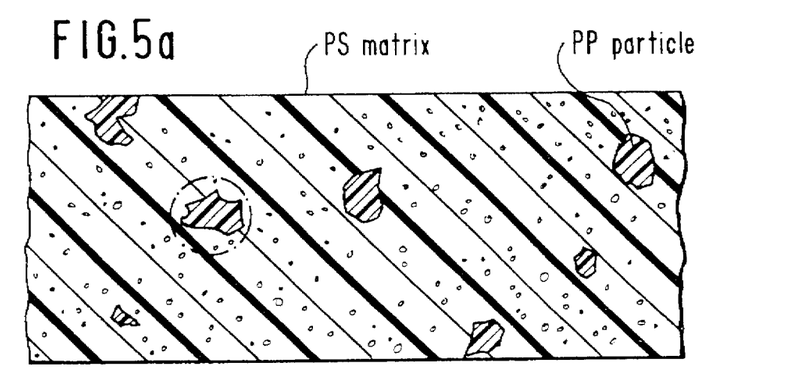
FIGS. 5a–5c schematically show the arrangement of foreign polymer particles in the cell structure or in a cell wall of an expanded plastic foam.
Figure 5B:
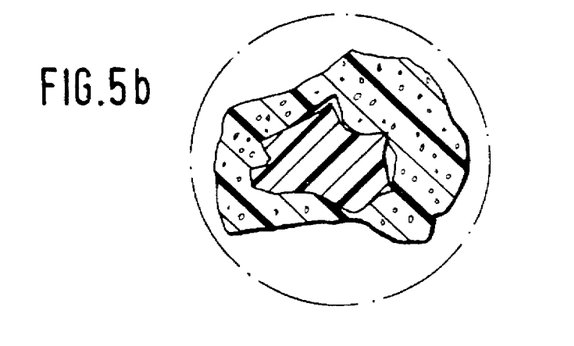

The term "foreign polymer" is to be understood in this context as generally meaning an amorphous, crystalline or semicrystalline thermoplastic which, due to its incompatibility in the polymer foam matrix, forms a disperse phase. The morphological form is a droplet-like structure, as shown in FIG. 5a. This is a polystyrene matrix in which the foreign polymer, which comprises polypropylene particles in the present case, is enclosed in the polystyrene foam matrix. As shown in the enlarged detailed view, in FIG. 5b, of such a polypropylene particle in the polystyrene foam matrix, the adhesive forces at the phase interfaces between the polystyrene foam matrix and the polypropylene particle are very low. In the foam formation process, in which large cell wall extensions are caused, cracking occurs at the phase interface, which leads to the open-cell structure of the polystyrene foam, especially in the case of extremely thin cell walls.

Figure 5C:
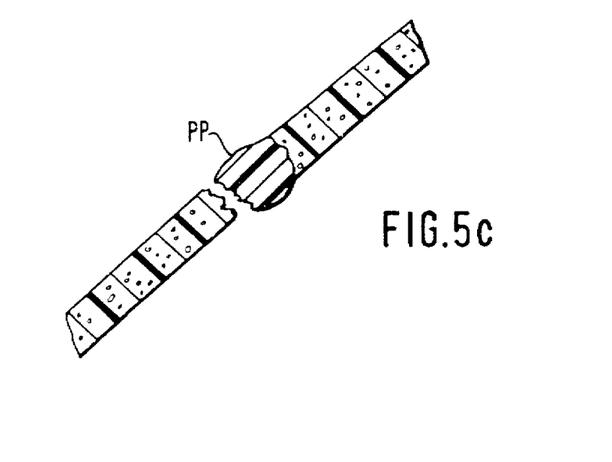

The cracking in a cell wall is shown in detail in FIG. 5c. The cell wall thickness is generally about 3 μm, and it is easy to see that, due to the cracking at the phase interface of the two different polymers, the cell wall substantially retains its shape and is not deformed. The cracking may be further increased by the larger volume contraction of the semicrystalline polymer, i.e., of the polypropylene, compared with polystyrene, during cooling at the phase interface, since it is known that the specific volume change of polypropylene in the same temperature range from 150° to 100° C. is much larger.

When polystyrene is used as the polymer, suitable foreign polymers are preferably polyethylene, polypropylene, polypropylene copolymers, ethylene/vinyl acetate copolymers, polymethyl methacrylate, polytetrafluoroethylene, polyurethane and mixtures thereof.

The blowing agents used are generally saturated, unsaturated or cyclic hydrocarbons, halogenated hydrocarbons, alcohols, water, nitrogen, carbon dioxide and mixtures thereof. Preferred blowing agents are methane, ethane, ethene, propane, propene, n-butane, 1-butene, 2-butene, isobutane, isobutene, n-pentane, isopentane, 2,2-dimethylpropane, cyclopentane, and mixtures thereof. Thus, for example, the blowing agent may be a mixture of propane and n-butane in a weight ratio of about 30 to 80% by weight of propane to about 20 to 70% by weight of n-butane. It is also possible to use only n-butane, particularly in the production of polystyrene foam. In general, carbonic acid, water, nitrogen, talc, chalk, sodium carbonate, sodium bicarbonate and/or citric acid, in an amount of about 0.05 to 5% by weight, preferably about 0.1 to 5% by weight based on the polymer melt, are added as nucleating agent. The foreign polymer is generally polyethylene, polypropylene, a polypropylene copolymer, polystyrene, ethylene/vinyl, an acetate copolymer, polymethyl methacrylate, polyurethane, polytetrafluoroethylene, and mixtures thereof. The foreign polymer may be added as granules, masterbatch or powder, and its amount, based on the polymer melt, is in the range from about 0.2 to 9% by weight.

When a foreign polymer is added to the starting materials of the polymer melt to be prepared, the optimum temperature of about 150° C. at the outlet of the extrusion die can be maintained. Without the addition of a wetting agent, the expanded plastic foams obtained are in general already suitable for absorbing apolar liquids, i.e., liquids similar to oil. The situation is different in the case of the absorption of polar liquids, such as water. Due to their surface tension, the water droplets generally assume a spherical shape, and consequently the phase boundary angle between the surface of the expanded plastic foam and the droplets of the polar liquid is generally too large, so that the polar liquid is not absorbed. In order to reduce the phase boundary angle of a polar liquid relative to the cell walls or relative to the surface of the expanded plastic foam, wetting agents comprising cationic, anionic, amphoteric or nonionic compounds are added to the polymer melt. These wetting agents may be selected, inter alia, from one or more of the alkylsulfonates, which in masterbatch form is added, for example, to the polystyrene melt. The amount of the alkylsulfonate(s), or other wetting agents is in general about 0.1 to 10% by weight, in particular about 0.5 to 5% by weight, based on the melt. While alkylsulfonates are preferred, any satisfactory wetting agent may be used.

In order to increase the absorption rate of polar liquids, one of the surfaces of the expanded plastic foam is subjected, for example, to a corona or corona aerosol treatment. It is also possible to provide one of the surfaces of the expanded plastic foam with a molecular coating by the so-called nebulization method in order to increase the absorption rate of polar liquids. The molecular coating also allows the expanded plastic foam to selectively absorb either the polar or the apolar component from an aqueous liquid, emulsion or the like.

The open-cell expanded plastic foams obtained can be produced in various thicknesses and can be processed to give sheets, profiles and blocks. They are used in particular as suction filters and as packaging shells for food or other moisture-containing goods.

FIG. 6 shows schematically sectional views, in magnified detail, of cell structures of expanded plastic foams and indicates their liquid absorption behavior.

Figure 6A:
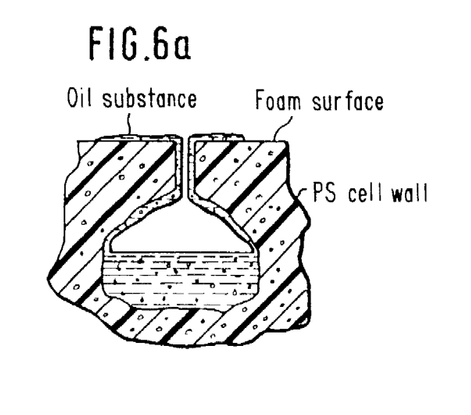
FIGS. 6a–6f shows schematic sectional views, in magnified detail, of cell structures of expanded plastic foams and the liquid absorption behavior thereof.
Figure 6B:
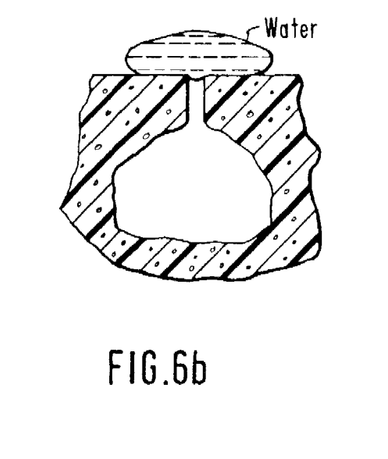

FIG. 6a shows an open-cell polystyrene foam which was produced using the basic formulation, as also stated below with reference to the examples. The starting materials of this polystyrene foam are polystyrene granules and talc as a nucleating agent. The open-pore structure is achieved by the high temperature at the outlet of the extrusion die. As can be seen in FIG. 6a, such a polystyrene foam has high absorptivity for an apolar liquid, for example, an oil, which means that this liquid can flow readily from the foam surface into the interior of the open cell. A different situation is encountered with regard to the absorptivity for a polar liquid, such as water, as is evident from FIG. 6b. Due to the high surface tension of the water drop, a relatively large phase boundary angle forms between the surface of the polystyrene foam and the water drop, with the result that penetration of the water drop into the open cell is substantially prevented. The same absorption behavior for apolar and polar liquids is also shown by open-cell polystyrene foams, in the production of which a foreign polymer is added to the basic formulation and the temperature at the extrusion die is about 150° C.

Figure 6C:
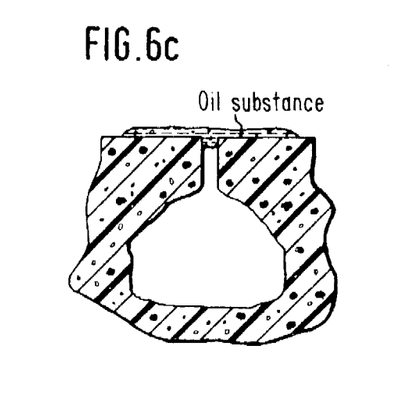
Figure 6D:
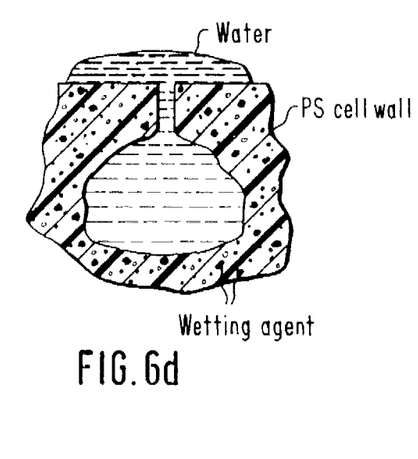

FIGS. 6c and 6d show the absorption behavior for apolar and polar liquids when a wetting agent is also added to the basic formulation in the production of the polystyrene foam. The wetting agent is indicated in the sectional views of FIGS. 6c and 6d by black dots in the polystyrene matrix and in the polystyrene cell walls, respectively. Due to the wetting agent, the phase boundary angle of polar liquids, in particular water, is reduced to such an extent that the polar liquid flows into the open cell without problems.

Figure 6E:
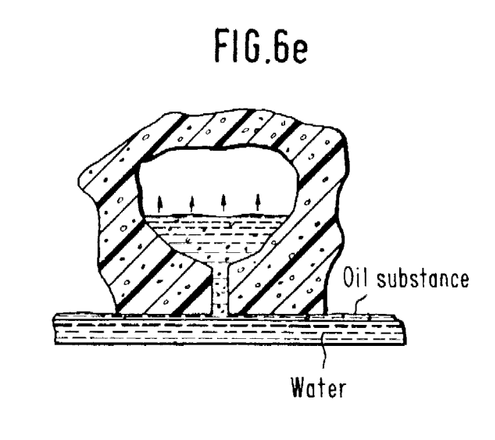

FIG. 6e shows that the absorption of an apolar liquid in an open-cell polystyrene foam without a wetting agent and without pretreatment can be stimulated, i.e., accelerated, by means of a corona discharge or a corona aerosol discharge. The polystyrene foam can be produced either at a high extrusion die temperature of about 170° C. or at the conventional temperature of about 150° C., but in this case with the addition of a foreign polymer.

Figure 6F:
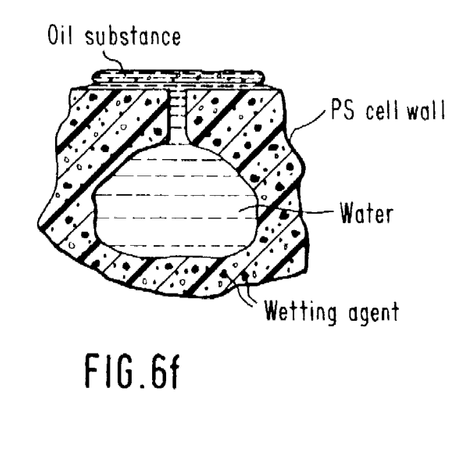

FIG. 6f shows that the absorption of polar liquid in a polystyrene foam which contains a wetting agent can be stimulated, i.e., accelerated, by a corona pretreatment. In the case of the embodiments of the polystyrene foam according to FIGS. 6e and 6f, the apolar (oil) or polar (water) liquid component is selectively absorbed from a liquid which contains both components.

Some examples of open-cell polystyrene foams having a foam density of 70–75 g/l are shown below in Table 1. In Example A, the standard formulation of starting materials of the polystyrene melt is used for the polystyrene foam, i.e., 95% by weight of polystyrene granules, 1% by weight of talc as a nucleating agent and 4% by weight of butane or a halogenated hydrocarbon as a blowing agent. The temperature at the outlet of the extrusion die is about 170° C. In each of Examples B and C, a foreign polymer is added in an amount of about 3% by weight, while the amount of the blowing agent remains unchanged and the amount of the nucleating agent is increased to 3% by weight. The temperature of the die is 150° C. during the extrusion process. Accordingly, the amounts of the polystyrene granules are 90 and 87% by weight, respectively. Furthermore, in Example C 3% by weight of a wetting agent, for example, an alkylsulfonate, are also added, with the result that the polystyrene foam thus obtained has a high selective absorptivity for polar or aqueous liquids. The polystyrene foam according to Example D contains 92% by weight of polystyrene, 1% by weight of a nucleating agent, no foreign polymer, 3% by weight of a wetting agent and 4% by weight of a blowing agent. The temperature at the die is 170° C. during the extrusion process.

The foam densities, the maximum liquid absorption for water and the absorptivity for polystyrene foams are summarized in Table 2. The liquid absorption is determined according to the formula $$\text{Liquid absorption} = \rho_L \left(1 - \frac{\rho_F}{\rho_{PS}}\right)$$

where the liquid density $\rho_L$, the foam density $\rho_F$ and the polystyrene density $\rho_{PS}$ are each in g/l. The absorptivity is a unitless number and is determined by dividing the maximum liquid absorption by the foam density.

TABLE 1

|  | A Standard formulation | B Selective absorption for oil-like liquids | C Selective absorption for aqueous liquids | D Selective absorption for aqueous liquids |
|---|---|---|---|---|
| PS granules | 95% | 90% | 87% | 92% |
| Nucleating agent (e.g., talc) | 1% | 3% | 3% | 1% |
| Foreign polymer e.g., PE, PP, PPC, EVA) | — | 3% | 3% | — |
| Wetting agent (e.g., alkylsulfonate) | — | — | 3% | 3% |
| Blowing agent (e.g., alkanes, such as butane, halogenated hydrocarbons) | 4% | 4% | 4% | 4% |
| Constellation | open | open | open | open |
| Cell structure (fine) ≤0.4 mm |  |  |  |  |

TABLE 2

| Foam density (g/l) | Maximum liquid absorption for water (g/l) | Absorptivity |
|---|---|---|
| 30 | 971.4 | 32.4 |
| 40 | 961.9 | 24.0 |
| 50 | 952.4 | 19.0 |
| 60 | 942.9 | 15.7 |
| 70 | 933.3 | 13.3 |
| 80 | 923.8 | 11.5 |
| 90 | 914.3 | 10.2 |
| 100 | 904.8 | 9.0 |

TABLE 3

| Polymer | closed-cell foam [°C.] | open-cell foam [°C.] |
|---|---|---|
| PETP | 228–243 | 246–262 |
| PP | 160–173 | 178–202 |
| PPC | 154–169 | 174–199 |
| PS | 135–160 | 169–200 |
| HDPE | 122–136 | 141–164 |
| LLDPE | 112–126 | 131–153 |
| LDPE | 104–119 | 123–144 |
| EVA | 101–116 | 120–140 |

What is claimed is:

1. A molded structure, comprising;

a single layer plastic foam comprising;

one or more polymers;

two initially closed surfaces;

polyhedron shaped cells disposed within said molded structure between said two initially closed surfaces and occupying at least 10% of the volume of said foam, said cells having walls, at least two walls of each of said cells having openings therein to form an open cell;

webs formed by said cell walls being arranged next to each other, said cells and webs defining a space maxtrix within said plastic foam, wherein said space maxtrix maintains its form in an undamaged configuration and is neither mechanically nor thermally deformed, and wherein at least a part of one of the surfaces of said foam is mechanically opened or opened by cooling and simultaneous extension upon emergence from an extrusion die so that the cells adjacent to the surface and all the cells within the structure which have openings in their walls are accessible to fluids.

2. A molded structure as claimed in claim 1, wherein said plastic foam comprises a polymer selected from the group consisting of a polyolefin, a styrene polymer, a polyester, an ethylene/propylene terpolymer, polyvinyl chloride, polyphenylene oxide, and a mixture thereof.

3. A molded structure as claimed in claim 1, wherein the plastic foam comprises a thermoplastic polymer, a blend of thermoplastic polymers, or a blend of a thermoplastic polymer and a nonthermoplastic polymer.

4. A molded structure, comprising;

an expanded plastic foam comprising two surfaces;

polyhedron shaped cells disposed within said foam and occupying at least 10% of the volume of said foam, said cells having walls, and at least two walls of each of said cells having openings therein to form an open cell;

webs formed by said cell walls being arranged next to each other, said cells and webs defining a space matrix within said expanded plastic foam, wherein said space matrix maintains its forming in an undamaged configuration and is neither mechanically nor thermally deformed, wherein the walls of the cells further comprise a particulate foreign polymer, which is incompatible with and forms a dispersed phase with the one or more polymer, and wherein the interface of the foreign polymer and the one or more polymer forms said openings in said walls.

5. A molded structure as claimed in claim 4, wherein the amount by weight of the foreign polymer is less than the amount by weight of the polymer.

6. A molded structure as claimed in claim 5, wherein the amount by weight of the foreign polymer is about 0.2 to 9% by weight.

7. A molded structure as claimed in claim 4, wherein the polymer is polystyrene and the foreign polymer is selected from the group consisting of polyethylene, polypropylene, a polypropylene copolymer, an ethylene/vinyl acetate copolymer, polymethyl methacrylate, polytetrafluoroethylene, polyurethane, and a mixture thereof.

8. A molded structure as claimed in claim 4, wherein said foam further comprises a nucleating agent and a wetting agent.

9. A molded structure as claimed in claim 8, wherein the density of said foam is in the range from about 0.020 to 0.350 g/cm$^3$.

10. A molded structure as claimed in claim 9, wherein the absorptivity of the expanded plastic foam for polar and apolar liquids is about 1 to 30 times the density of the expanded foam.

11. A molded structure as claimed in claim 1, wherein the cells have a maximum dimension of about $\leq 1.0$ mm.

12. A molded structure as claimed in claim 1, produced by a process comprising the steps of:

melting a mixture in a first extrusion step at a temperature of $\leq$ about 300° C. to form a polymer melt, said mixture comprising at least one polymer and at least one nucleating agent;

injecting a blowing agent into said polymer melt at the end of said first extrusion step;

mixing said blowing agent homogeneously with said polymer melt;

cooling said polymer melt in a second extrusion step; and extruding said polymer melt to form an expanded plastic foam having two surfaces and open cells in the interior of said expanded plastic foam, wherein said open cells are formed by cooling said polymer melt in said second extrusion step to a melt temperature which is in the lower limit of the pseudoplastic viscous temperature range of said at least one polymer immediately before extrusion, wherein said melt temperature of said mixture in said second extrusion step is approximately 10 to 20% higher than the melt temperature during extrusion of a closed cell expanded plastic made of an identical mixture; and partially opening at least one of the surfaces of the extruded expanded plastic foam by at least one of mechanical processing, and cooling and simultaneous stretching upon emergence from said second extrusion step.

13. A molded structure as claimed in claim 12, wherein said open cells are formed by cooling said polymer melt in said second extrusion temperature to a melt temperature which is in the lower limit of the pseudoplastic viscous temperature range of said at least one polymer immediately before extrusion, wherein said melt temperature of said mixture in said second extrusion step is approximately 10 to 20% higher than the melt temperature during extrusion of a closed cell expanded plastic foam made of an identical mixture.

14. A molded structure as claimed in claim 12, wherein the starting materials of the expanded plastic foam are at least one polymer and one blowing agent and one nucleating agent.

15. A molded structure as claimed in claim 14, wherein the polymer melt comprises up to about 95% by weight of polystyrene; up to about 3% by weight of said nucleating agent selected from the group consisting of talc, chalk, sodium carbonate, sodium bicarbonate, and citric acid; and up to about 6% by weight of said blowing agent selected from the group consisting of butane, propane, and a mixture thereof.

16. A process for the production of an open-celled plastic foam which contains at least 10% by volume of open cells, said process comprising the steps of:

melting a mixture in a first extrusion step at a temperature of $\leq$ about 300° C. to form a polymer melt, said mixture comprising at least one polymer and at least one nucleating agent;

injecting a blowing agent into said polymer melt at the end of said first extrusion step;

mixing said blowing agent homogeneously with said polymer melt;

cooling said polymer melt in a second extrusion step to a pre-selected temperature determined, based on the composition of said plastic, to provide an open-celled foam upon extrusion; and extruding said polymer melt to form an open cell expanded film, wherein said open cells are formed by cooling said polymer melt in said second extrusion step to a melt temperature which is in the lower limit of the pseudoplastic viscous temperature orange of said at least one polymer immediately before extrusion, wherein said melt temperature of said mixture in said second extrusion step is approximately 10 to 20% higher than the melt temperature during extrusion of a closed cell expanded plastic made of an identical mixture.

17. The process as claimed in claim 16, wherein said open cells are formed by cooling said polymer melt in said second extrusion temperature to a melt temperature which is in the lower limit of the pseudoplastic viscous temperature range of said at least one polymer immediately before extrusion, wherein said melt temperature of said mixture in said second extrusion step is approximately 10 to 20% higher than the melt temperature during extrusion of a closed cell expanded plastic foam made of an identical mixture.

18. The process as claimed in claim 16, further comprising the step of partially opening at least one of the surfaces of the extruded expanded plastic foam by at least one of mechanical processing, or cooling and simultaneous extension upon emergence from said second extrusion step.

19. The process as claimed in claim 16, wherein said at least one polymer is selected from the group consisting of a polyolefin, a styrene polymer, a polyester, an ethylene/propylene terpolymer, polyvinyl chloride (PVC) and polyphenylene oxide.

20. The process as claimed in claim 16, wherein said blowing agent is selected from the group consisting of a saturated, unsaturated or cyclic hydrocarbon, a halogenated hydrocarbon, an alcohol, water, nitrogen, carbon dioxide and a mixture thereof.

21. The process as claimed in claim 16, wherein said blowing agent is a hydrocarbon and is selected from the group consisting of methane, ethane, ethene, propane, propene, n-butane, 1-butene, 2-butene, isobutane, isobutene, n-pentane, isopentane, 2,2-dimethylpropane, cyclopentane and a mixture thereof.

22. The process as claimed in claim 21, wherein said blowing agent comprises a mixture of propane and n-butane and includes about 30 to 80% by weight of said propane to and 20 to 70% by weight of said n-butane.

23. The process as claimed in claim 16, wherein said nucleating agent is selected from the group consisting of carbonic acid, water, nitrogen, talc, chalk, sodium carbonate, sodium bicarbonate, citric acid and a mixture thereof, and said nucleating agent is added in an amount by weight of about 0.05 to 5% by weight, based on the polymer melt.

24. The process as claimed in claim 16, wherein one of the surfaces of said molded structure is subjected to at least one of a corona process, a corona aerosol process or a molecular coating process in order to increase the absorption rate of polar liquids.

25. A packaged article comprising, the molded structure as claimed in claim 1, and a moisture containing product.

26. A suction filter for polar and/or apolar liquids, comprising the molded structure as claimed in claim 1, configured in the shape of a suction filter.

27. A molded structure as claimed in claim 1, wherein said structure is a single layer.

28. A molded structure as claimed in claim 1, wherein only one of the two initially closed surfaces is opened.

29. A process for the production of an open-celled plastic foam which contains at least 10% by volume of open cells, said process comprising the steps of:

melting a mixture in a first extrusion step at a temperature of ≦ about 300° C. to form a polymer melt, said mixture comprising at least one polymer, one or more foreign polymers and at least one nucleating agent, wherein the wettability of said one or more foreign polymers in said polymer melt is substantially zero;

injecting a blowing agent into said polymer melt at the end of said first extrusion step;

mixing said blowing agent homogeneously with said polymer melt; and extruding said polymer melt to form an open cell plastic foam, wherein said open cells are formed by the presence of the one or more foreign polymers in the polymer melt.

30. A molded structure as claimed in claim 4, produced by a process comprising the steps of:

melting a mixture in a first extrusion step at a temperature of ≦ about 300° C. to form a polymer melt, said mixture comprising at least one polymer, one or more foreign polymers and at least one nucleating agent, wherein the wettability of said one or more foreign polymers in said polymer melt is substantially zero;

injecting a blowing agent into said polymer melt at the end of said first extrusion step;

mixing said blowing agent homogeneously with said polymer melt; and extruding said polymer melt to form an open cell plastic foam, wherein said open cells are formed by the presence of the one or more foreign polymers in the polymer melt.

31. A molded structure as claimed in claim 30, wherein the polymer melt comprises about 90% by weight of polystyrene granules, about 3% by weight of talc, up to about 4% by weight of butane and up to about 3% by weight of polypropylene copolymer as the foreign polymer.

32. A molded structure as claimed in claim 30, wherein the polymer melt comprises about 87% by weight of polystyrene granules; about 3% by weight of talc; about 4% by weight of a blowing agent selected from the group consisting of butane, propane and a hydrogencontaining fluoroalkane; about 3% by weight of a foreign polymer selected from the group consisting of polypropylene, a polypropylene copolymer and polyethylene; and about 3% by weight of alkanesulfonate as a polar wetting agent.

33. The process as claimed in claim 29, wherein said at least one polymer is polystyrene and said foreign polymer is selected from the group consisting of polyethylene, polypropylene, a polypropylene copolymer, an ethylene/vinyl acetate copolymer, polymethyl methacrylate, polyurethane and polytetrafluoroethylene, said foreign polymer is added to the polymer melt, and the cell walls are opened by the foreign polymer in the polymer melt without mechanical destruction of the webs of the cell walls.

34. The process as claimed in claim 29, wherein said foreign polymer is added as granules, masterbatch or powder, and its amount by weight is about 0.2 to 9% by weight based on the polymer melt.

35. The process as claimed in claim 29, wherein a wetting agent comprising a cationic, anionic, amphoteric or nonionic compound is added to the polymer melt to reduce the phase boundary angle of a polar liquid relative to the cell walls of the expanded plastic foam.

36. The process as claimed in claim 35, wherein at least one alkanesulfonate is metered in as said wetting agent in masterbatch form, and the amount by weight of said alkanesulfonate(s) is about 0.1 to 10% by weight based on the polymer melt.

\* \* \* \* \*